United States Patent Office 3,488,447
Patented Jan. 6, 1970

3,488,447

PATHFINDER SYSTEM FOR TELEPHONE EXCHANGE SWITCHING NETWORK

Hans Baur, Munich, Norbert Bininda, Munich-Solln, Friedrich Hilliges, Eicheanau, and Dieter Voegtlen, Starnberg, Germany, assignors to Siemens Aktiengesellschaft, Munich, Germany Filed Apr. 25, 1966, Ser. No. 544,936
Claims priority, application Germany, Apr. 26, 1965, S 96,765
Int. Cl. H04m 3/00
U.S. Cl. 179—18 13 Claims

ABSTRACT OF THE DISCLOSURE

An exchange switching network for a telephone system in which all connection lines or conductors and connection links (such as repeaters, registers, ringing signal generators, etc.) are connected to the same side of the network. A patfinder system selects from the various connection paths, the path which traverses the smallest number of switching stages.

This invention is related to Ser. No. 443,242 filed on Mar. 29, 1965, in the names of Norbert Bininda et al., entitled Arrangement for Long-Distance Communication Exchange Installations in Particular, Telephone Exchange Installations, and now abandoned; Norbert Bininda et al., Ser. No. 537,980 filed on Mar. 28, 1966, bearing the same title; Norbert Bininda et al., Ser. No. 541,166 filed on Apr. 8, 1966, entitled Circuit Arrangement for Communication Systems, Particularly, for Telephone Communication Systems. These applications are expressly incorporated herein.

INTRODUCTION

The present invention relates to a circuit arrangement for communication exchange systems, and more particularly for telephone communication exchange systems comprising at least one switching network including a plurality of switching stages.

STATE OF THE PRIOR ART

Co-pending patent application Ser. No. 443,242 filed on Mar. 29, 1965, and assigned to the same applicant describes a circuit arrangement for communication exchange systems, particularly telephone exchange systems comprising several exchange switching stages having inputs and outputs which are connected with each other by intermediate lines (links). The subscriber lines, the connecting lines as well as the inputs and outputs of circuit means necessary for establishing and controlling each connection are also connected to the inputs of the first switching stage. The outputs of all stages, with the exception of the last switching stage, are connected to the inputs of the respective following switching stage, and are connectable in pairs in the following stage. The circuit means may comprise, for example, connecting sets, registers, signal generators and the like.

A connection in such an exchange system always involves interconnecting two inputs of the first switching stage with each other, either once or several times. Such inputs of the first stage may be considered to represent equivalent end points in a through connection. Thus, in the above described system, through connections are possible between all of the lines and circuit means. Further, in the above described system it is possible to connect two inputs of the first switching stage with each other in the last switching stage or, alternatively, such a connection can be made without including the last stage in the connection.

OBJECTS

It is the primary object of the present invention to improve the above system by employing facilities which assure that a minimum number of said switching stages is used for each connection.

Another object of the invention is to provide facilities which distribute the traffic load for the switching stages of a coupling field so that the load diminishes as the stages are more and more remote from the first stage.

A further object of the invention is to design the switching stages so that each successive stage after the first stage requires fewer and fewer component parts as each successive stage is farther and farther from the first stage in a switching network.

Yet another object of the invention is to provide always the shortest possible connection between two input means of a switching network.

Still another object of the invention is to provide circuit means wherein holding circuits can be established in the same manner as through connections.

According to the invention, the above objects have been achieved in essence, by pathfinder means which select from the available through connecting paths via free intermediate lines, the path which runs through the least number of switching stages between the inputs of the first switching stage which are to be connected with each other.

In a further embodiment of the invention, the pathfinder means of a switching network marks the multiple switches by operating a relay. Two of the inputs of the multiple switch are connected with each other for establishing a connection; and the multiple switch inputs are connected through the switching network to the input means which are to be connected with each other.

DRAWINGS

The invention will now be more fully described in conjunction with an operative embodiment thereof shown in the accompanying drawings, wherein.

DESCRIPTION OF THE INVENTION

Figure 1:
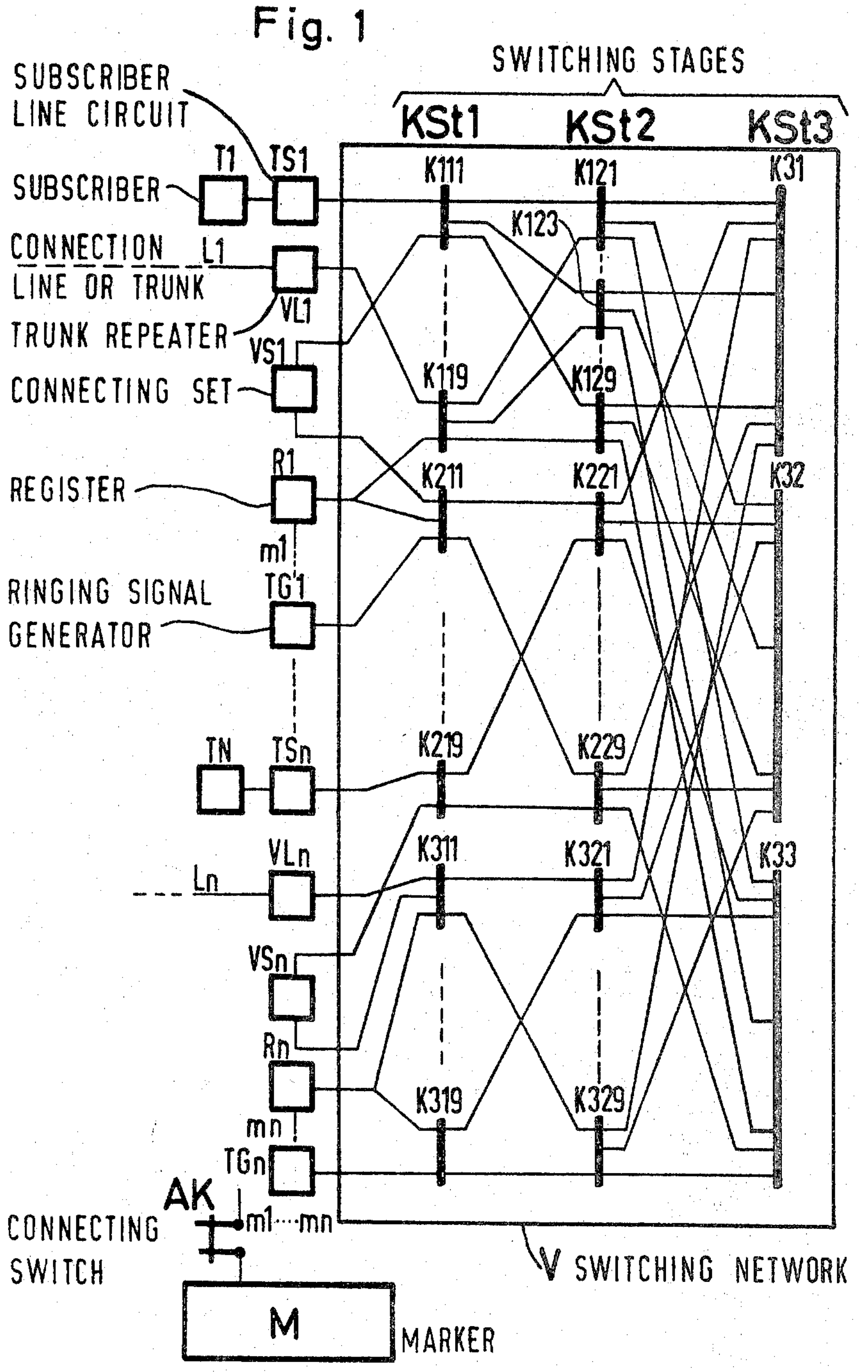
FIG. 1 shows a switching network (V) which includes three switching stages (KSt1, KSt2, and KSt3)

In FIG. 1 there is shown an exchange network V, also designated a switching network. The network is formed by multiple switches K111 to K339, for example, relay switches, arranged in three exchange circuit stages or switching stages KSt1 to KSt3. The switches are connected with each other between successive smitching stages each by intermediate lines or links (unnumbered). Subscribers T1 to Tn are connected to the isputs of the switches of the switching stage KSt1 via subscriber line circuits TS1 to TSn; further connection lines or trunks L1 to Ln are connected thereto via trunk repeaters VL1 to VLn; further, the inputs and outputs of the connecting sets VS1 to VSt and the registers R1 to Rn and ringing signal generators TG1 to TGn are also so connected. A central marker M is also shown which is connectable to the registers R1 to Rn through a connecting switch AK. The marker M marks circuit means and lines to be connected with each other in accordance with received dialing information. Connections between any of the lines and any other line, or circuit means, or between circuit means run through switches of the first, or through switches of the first and second, or through all three switching stages. The switches K111 to K33 are in the nature of matrices or coordinates comprising first and second inner lines which cross each other. A switching relay is provided at each crosspoint where the first and second inner lines are connectable with each other by means of the contacts of the switching relays. The first inner lines correspond to or are connected to the inputs of the respective switch; and the second inner lines correspond to or are connected to the outputs of the respective switch.

Within the switching field V the switches are connected with each other by means of the intermediate lines. The outputs (extending out of the right hand side) of a switch of the first and second switching stage are connected individually to inputs (extending into the left hand side) of a switch of the second and third switching stage, respectively. Thus, outputs of preceding stages are individually connected to inputs of succeeding stages through individual intermediate lines. The intermediate lines between the first two switching stages run only within so-called groups of switches of the first and second switching stages KS*t*1 and KS*t*2. On the other hand, the intermediate lines between the second and third switching stage run from each switch of the second switching stage to each switch of the third switching stage.

Each of the first and second switching stages (KS*t*1 and KS*t*2) comprises three switch groups each of which includes nine switches as follows: K111 to K119; K211 to K219; K311 to K319; K121 to K129; K221 to K229; and K321 to K329. The third stage KS*t*3 comprises three larger switches K31, K32, K33. These particular numbers are merely examples of one design and can be modified as desired.

A plurality of connection paths are provided for making any one particular connection. However, some of the connection paths which extend via free or idle intermediate lines may be marked busy. For example subscriber T1 may be connected with connection line or trunk L1 through the respective connection line repeater VL1 via the following switches provided that the respective intermediate lines are free: TS1, K111, one of K121 to K129, one of K31 to K33, one of K121 to K129, K119, VL1, L1.

Two paths among the many possible path combinations resulting from the foregoing, may be established through the following switches, having regard to the busy status of the intermediate lines:

(A) TS1, K111, K121, K31, K129, K119, VL1;
(B) TS1, K111, K123, K119, VL1.

Path (B) is substantially shorter than path (A). The pathfinder circuit of the present invention as described below with reference to FIG. 3 would select from the two mentioned paths, in the above example, the shorter path running through the switch K123.

Figure 2:
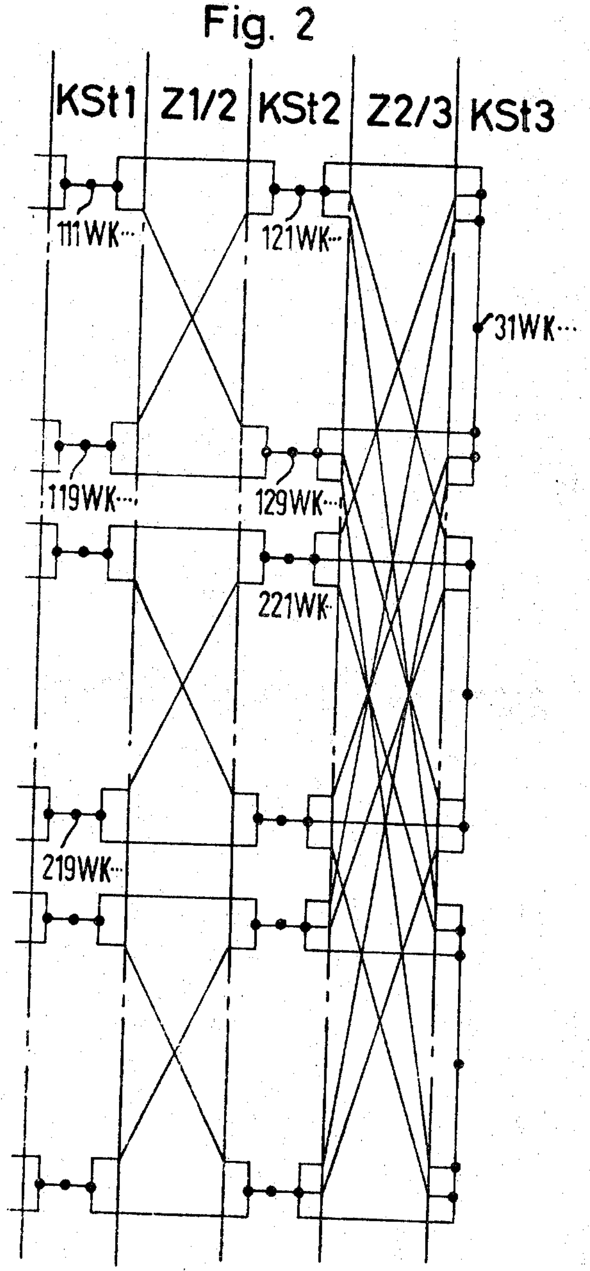
FIG. 2 shows a pathfinder network according to the present invention illustrating connection paths without the details of the wiring of circuit means.
Figure 3:
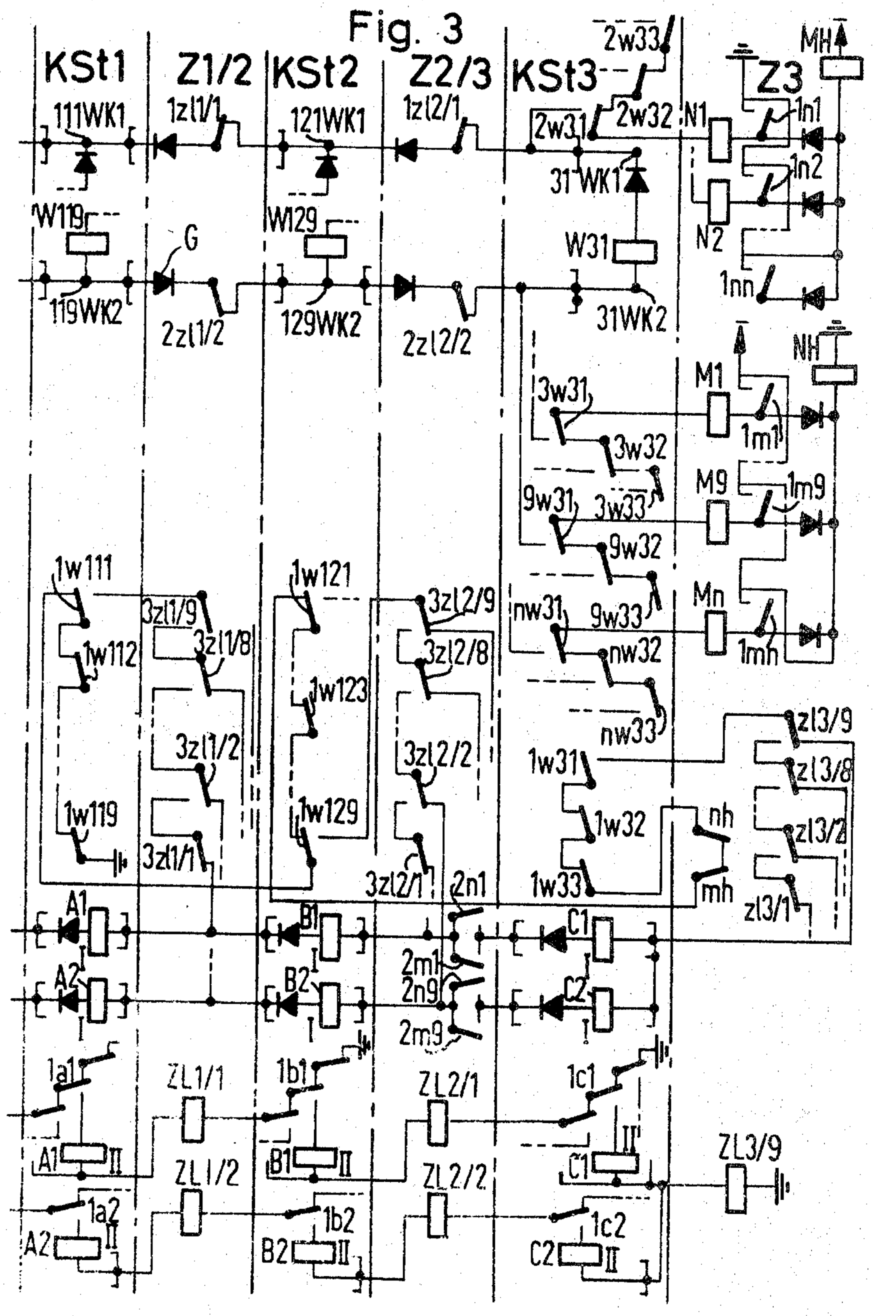
FIG. 3 shows a pathfinder circuit according to the present invention for selecting the shortest possible connections.

Superimposed on the switching network V of FIG. 1 is a pathfinder network shown in FIG. 2 which represents a single pathfinder network. In practice there are two such identical networks, one of which has been omitted for the sake of simplicity. The following description will refer to two pathfinder networks. Each network occupies a pathfinder network plane; and each network comprises for each multiple switch in switching network V a pathfinder junction. Thus, pathfinder junctions 111WK and 129WK in FIG. 2 correspond to switches K111 and K129 of FIG. 1. This applies also to the other pathfinder plane which is not shown. As illustrated in FIG. 3, whether a junction lies in one or the other pathfinder plane is indicated by the last number, as 111WK1 and 129WK2.

The pathfinder junctions of FIG. 2 are connected with each o her through intermediate line wires Z1/2 and Z2/3, FIG. 2 merely shows the connection path of such wirings, but not the details of the wiring circuit means.

FIG. 3 shows how the intermediate lines are part of the pathfinder network. The upper portion of FIG. 3 shows in part a pathfinder current circuit as it becomes effective to establish connection. The portion of the circuit running through pathfinder junctions 111WK1, 121WK1, 31WK1 lies in the first pathfinder plane. The portion of the circuit running through pathfinder junctions 119WK2, 129WK2, and 31WK2 lies in the second pathfinder plane.

The pathfinder junctions, for example, 31WK1 and 31WK2, which correspond in the two pathfinder planes to the same switch (in this instance K31) are connected with each other through a relay W31 which thus also corresponds to the switch. The rectifiers, e.g. G, serve for decoupling.

If a connection is to be established, for instance, between subscriber T1 (FIG. 1) and connection line or trunk L1, then marker M will apply a pathfinder potential through the subscriber circuit TS1 and trunk repeater VL1, to the respective pathfinder circuits. Let it be assumed that the pathfinder potential applied in the subscriber circuit TS1, to the respective pathfinder wire of the first pathfinder plane is a minus or negative potential, and that the pathfinder potential applied in the connection line repeater VL1 to the respective pathfinder wire in the second pathfinder plane is ground potential.

For the intermediate lines there are provided individually respective intermediate line relays (FIG. 3), for example ZL1/1; ZL1/2; ZL2/1; ZL2/2; and ZL3/9. The energized or deenergized condition of these relays designates the respective busy or idle (free) condition of the corresponding intermediate line. If these relays are energized or tripped then the respective intermediate line is busy, otherwise it is free.

The energizing windings of these relays are connected to holding circuits of the intermediate lines. These intermediate line relays designate as busy the corresponding intermediate line, through their contacts (FIG. 3) for example, 1*zl*1/1 by opening the pathfinder wires of the respective intermediate line.

It will be assumed that only the intermediate lines between couplers K111, K121, K31, K129 and K119 are free. The supplied pathfinder potentials reach the pathfinder relay W31 (FIG. 3) from subscriber circuit TS1 and from connection line repeater VL1 through pathfinder junctions 111WK1, 119WK2, 121WK1, 129WK2, 31WK1, 31WK2 and through the pathfinder network in both pathfinder planes. Relay W31 is energized in the following circuit:

(1) Ground at VL1, 119WK2, 2*zl*1/2, 129WK2, 2*l*2/2, 31WK2, W31, 31WK1, 1*zl*2/1, 121WK1, 1*zl*1/1, 111WK1, negative at TS1.

In the same manner all pathfinder relays are energized if a path can be established through free intermediate lines in the switching network V between their respective switches and each of the two marked input means of the switching network.

The pathfinder relays have make-and-break contacts (FIG. 3), for example 1*w*111, 1*w*121, 1*w*31, whose normally connected contacts are connected in a single chain or series. These contacts respectively correspond to relays W111, W121, W31, etc. The ground potential connected to the center contact spring of the first make-and-break contact 1*w*119 in such a chain becomes effective for pathfinder marking through an actuated one of these contacts which is closest to the first contact 1*w*119. All other contacts of this chain are simultaneously disconnected.

As a result, the only energized relay is relay W31 (FIG. 3). Thus the path for the desired connection between subscriber circuit TS1 and connection line repeater VL1 is fixed and must be established through multiple switch K31 (FIG. 1). This path must include two inputs of switch K31 and a second inner line which corresponds to an output of switch K31. However, the outputs of this switch are not connected to any circuit means. The second inner lines of this switch which correspond to its outputs serve solely for interconnecting two of its inputs.

A further selection operation determines through which of the switches of the second switching stage KS*t*2 the subscriber circuit TS1 and the connection line repeater VL1 are connected with switch K31. Only those switches of the second switching stage which have free intermediate lines to the respective switches in the first switching stage and to switch K31 can serve this purpose. Whether there are such free intermediate lines is ascertainable from pathfinder wires which end in pathfinder junctions 31WK1 and 31WK2 (FIG. 3). Those pathfinder wires which are connected to switches of the second switching stage carry the marking potential connected to the subscriber circuit TS1 and to the connection line repeater VL1, if said switches in the second stage are in turn connectable through free intermediate lines with switches K111 and K119 of the first switching stage KS*t*1. This is effected by the rest or normally-made contacts of the intermediate line relays in the pathfinder wires.

Thus in the above-mentioned further selection operation, one each of said pathfinder wires of the intermediate lines, ending in pathfinder junctions 31WK1 and 31WK2 is selected. For this purpose these pathfinder wires of both pathfiender planes are connected individually through contacts 3*w*31, 9*w*31, *nw*31, 2*w*31 (all of relay W31) and further contacts (not shown) of relay W21 to two selection relay chains N1, N2 . . . M1 . . . M9, M*n*. Relay chain N1, N2 serves the first pathfinder plane and relay chain M1 . . . M9, M*n* serves the second pathfinder plane.

Relays N1 and M9 are energized in the following circuits:

(2) Negative potential at TS1, 111WK1, 1*zl*1/1, 121KW1 1*zl*2/1, 2*w*31, N1, 1*nn* . . . 1*n*2, 1*n*1, ground: and (3) ground potential at VL1, 119WK2, 2*zl*1/2, 129WK2, 2*zl*2/2, 9*w*31, M9, 1*mn* . . . 1*m*9, 1*m*1, negative.

Relays N1 and M9 establish their own holding circuits through the actuation of their respective contacts 1*n*1 and 1*m*9 so that it is impossible for all other corresponding relays to be energized. Relays N1, N2 . . . and M1, M2 . . . are assigned in pairs (for example N2, M2) to switches K121 to K329 (FIG. 1) of the second switching stage KS*t*2. For switches K31, K32, K33 these relays are provided in common. Contacts, for example, 3*w*31, 3*w*32, 3*w*33 (FIG. 3) of three different pathfinder relays W31, W32, W33 provided respectively for switches K31, K32, K33 alternatively energize relays N1 . . . M1 . . . by alternatively connecting the relays N1 . . . M1 . . . to pathfinder wires of intermediate lines connecting to said three switches When the pathfinder device of FIG. 3 is in a condition ready for operation, relays MH and NH are energized in respective circuits which are opened as soon as one of said relays M1 . . . and N1 . . . is energized so that relay M*h* and NH are deenergized. Contacts *nh* and *mh* (shown in their energized condition) provide or prepare energizing circuits for the switching relays of a through connection to be established. For this purpose, negative potential is applied to tripping wires in the subscriber circuit TS1 and in the connection line repeater VL1 during the pathfinder operation and while relays MH and NH are energized.

Closed contacts 2*n*1 and 2*m*9 (FIG. 3) designate the intermediate lines to two predetermined switches of the second switching stage KS*t*2 and thereby also designate such switches as well as the intermediate lines to the switches of the first switching stage KS*t*1. The subscriber circuit TS1 and the connection line repeater VL1 are connected to the inputs of said switches of the first switching stage. The switching relays in the three switching stages are now energized in the following circuit:

(4) Ground, 1*w*119 . . . 1*w*112, 1*w*111 . . . 1*w*129 . . . 1*w*123, . . . 1*w*121, *mh, nh*, 1*w*33, 1*w*32, 1*w*31, *zl*3/9, $$\frac{\text{C1(I), }2n1\text{, B1(I), A1(I), negative potential at TS1}}{\text{C2(I) }2m9\text{, B2(I), A2(I), negative potential at VL1}}$$

The rectifier in all circuits, except the one lettered G, are not specifically designated. These rectifiers all serve for decoupling purposes.

Circuit (4) above includes a chain of contacts 1*w*33, 1*w*32, 1*w*31 for selecting one of the three switches of the third switching stage. The actuated position of any one of these contacts marks the respective switch through which the connection is to be established.

Each switch of the third switching stage KS*t*3 comprises second inner lines to which intermediate line relays, for example ZL3/9, are assigned even if these inner lines are not connected to intermediate lines. If any of such second inner lines is busy, then the holding circuit of the respective connection runs through the corresponding intermediate line relays, for instance ZL3/9, as will be described in more detail below. In the present example let it be assumed that the second inner line is free. Contact *zl*3/9 is then in its normal position. If the line were busy, this contact would be in its actuated position. The chain of contacts *zl*3/9 . . . *zl*3/9 thus designates the particular second inner line which is to be used for the connection.

In view of the above, the circuit means mentioned in circuit (4) precisely defines the connection to be established in all of its individual members. Switching relays A1, B1, C1, A2, B2, C2, of switches K111, K121, K31, K119, and K129, are energized or tripped and establish the connection shown in the lower portion of FIG. 3. The connection is shown as comprising a single wire but, if desired, the connection can comprise a plurality of wires. A reference to a two wire talking connection may be made by designating the contacts, for example 2/3*a*1, and so forth.

Marker M simultaneously connects in the subscriber circuit TS1 the holding potential (negative) to the holding windings of relays A1, A2 and interrupts circuit (4). The holding potential keeps relays A1, A2; B1, B2; C1, C2; energized through their holding windings II. Furthermore, the intermediate line relays of the intermediate lines participating in the connection, are energized in such a holding circuit as shown at the bottom of FIG. 3: ZL1/1, ZL1/2, ZL2/1, ZL2/2, ZL3/9. Thus, these relays designate through their contacts 1*zl*1/1, 2*zl*1/2, 1*zl*2/1, 2*zl*2/2, and *zl*3/9 the corresponding pathfinder wires or trip wires of the respective intermediate lines as busy thereby preventing further through connections via such intermediate lines.

The talking circuits are not shown. They are formed in a known manner in that at the junction of each first inner line with each second inner line, all talking wires are individually interconnectable, each by a single operating contact of the switching relay connected to the respective junction.

It will now be assumed that in addition to the intermediate lines which were free and were not marked busy, in the above example, there is still another free intermediate line, between switches K111 and K129. In this instance the pathfinder relay W129 provided for the switch K129, is energized in the same manner as described above for pathfinder relay W31. Contacts 1*w*129 by being actuated prevents the completion of circuit (4). Upon being actuated, the contacts 1*w*129 connect ground potential to a chain of make-and-break contacts, for example 3*zl*2/9, 3*zl*2/8 . . . of intermediate line relays of those intermediate lines which are connected to the outputs of switch K129. This chain of contacts designates a specfific intermediate line by supplying ground potential to the trip wire of the corresponding intermediate line through the normal position of the corresponding intermediate line relay contacts, for example, 3*zl*2/9. There is only one path which is connectable from the subscriber circuit TS1 to switch K129 and from connection line repeater VL1 to switch K129. Therefore, no further selection is necessary, as it would be in a through connection via a switch of the third switching stage KS*t*3. Only one branch of the resulting energizing or trip circuit is shown:

(5) Ground, 1*w*119 . .. 1*w*112, 1*w*111, 1*w*129, 3*zl*2/9, 3*zl*2/8 . . . 3*zl*2/2,
B2(I), A2(I), (negative at VL1)
____________________
. . . . . . . . (negative at TS1)

In this circuit the switching relays of the switches K111, K119, K129 are energized Only a portion of the second inner lines which correspond to the outputs of the switches of the first and second switching stage, is connected through such outputs via intermediate lines to the next switching stage. This is because some of these second inner lines serve solely for connecting two inputs of the respective switch with each other, for example, when the pathfinder relay W129 has tripped.

Each chain of contacts (for example 3*z*12/9 to 3*z*12/1, of the intermediate line relays corresponding to the outputs of a switch), is arranged in such a manner that the contacts, for instance, 3*z*12/9, 3*z*12/8, of those intermediate line relays are connected closest to the contact 1*w*129 of the corresponding pathfinder relay, e.g. W129. Such relays correspond to no intermediate lines but merely to second inner lines. The contacts of those intermediate line relays which are associated with the intermediate lines to the next switching stage then follow in the contact chain. This feature of the invention assures that inputs of switches of the first and second switching stage are always connected in pairs preferably through such second inner lines of the switch, the corresponding outputs of which are not connected to any circuit means. Only when all of such second inner lines are busy, will two inputs be connected in pairs in a switch in an overflow fashion through second inner lines which are connected to the next switching stage through intermediate lines. Thus, all second inner lines which are not connected to intermediate lines will be employed before those which are so connected.

The holding circuits for completed through-connections are also completed via switching relay contacts, (for example, 1*a*1, 1*b*1, 1*c*1, 1*a*2, 1*b*2, 1*c*2 bottom of FIG. 3). When a connection does not run through three switching stages, as described above, but merely through two switching stages, as just described, then the connection is established through a second inner line of the respective multiple switch of the second switch stage. This second inner line may be connected to an intermediate line leading to the next switch stage. This is so, if all non-connected second inner lines have been found busy during the pathfinding. In such instance, the holding circuit for an established connection runs through the respective intermediate line relay, for example ZL2/1, of the intermediate line leading to the next switching stage KS*t*3; and it runs from that switching stage through a chain of make-and-break contacts of those switching relays which are associated with the switch of the third switching stage and the first inner line is connected to said intermediate line. Thus, if a second inner line of the switch serves for connecting in pairs two of its inputs, then the switching relays of the corresponding first inner line of the switch of the next switching stage remain deenergized, so that the holding circuit can be established through a chain of make-and-break contacts (in normal positions) of these switching relays.

But if a second inner line, through which two inputs of a switch are connected in a pair, is not connected to an intermediate line leading to the next switching stage (that is, if such second inner line remains unconnected) then the intermediate line relay which is nevertheless associated with such second inner line, is connected to ground potential. Just as is shown in switching stage KS*t*3 for relay ZL3/9, the intermediate line relays corresponding to second inner lines of the switches of the first and second switching stages are also connected to ground potential if such second inner lines are without intermediate lines leading to the next switching stage (that is, if such second inner lines in switches of the first and second switching stage are unconnected). It is not necessary to arrange the holding contacts of the switches of the second and third switching stages in a chain, if, in the first and second stages, the second inner lines connected to intermediate lines are used only for making connections which run through succeeding stages; and if the second inner lines which do not have intermediate lines, are used only for making connections through two inputs of a switch and not through subsequent stages. Instead, it is possible to connect the holding windings of the switching relays through their own operating contacts between the holding wires of the intermediate lines, wherein the holding wires cross each other at such switching point. Thus, the holding circuits always end at an intermediate line relay, such as ZL3/9, which is directly connected to ground. Also, such contact chains are not needed in the switches of the stage KS*t*1 because the switching relay holding windings can be connected individually between the holding wires of the respective intermediate lines through individual work contacts.

An interruption or release of a connection is accomplished by the switch means and lines connected to the input means of the switching network V. However, no interruption is made as long as pathfinding and setting operation take place.

Figure 4:
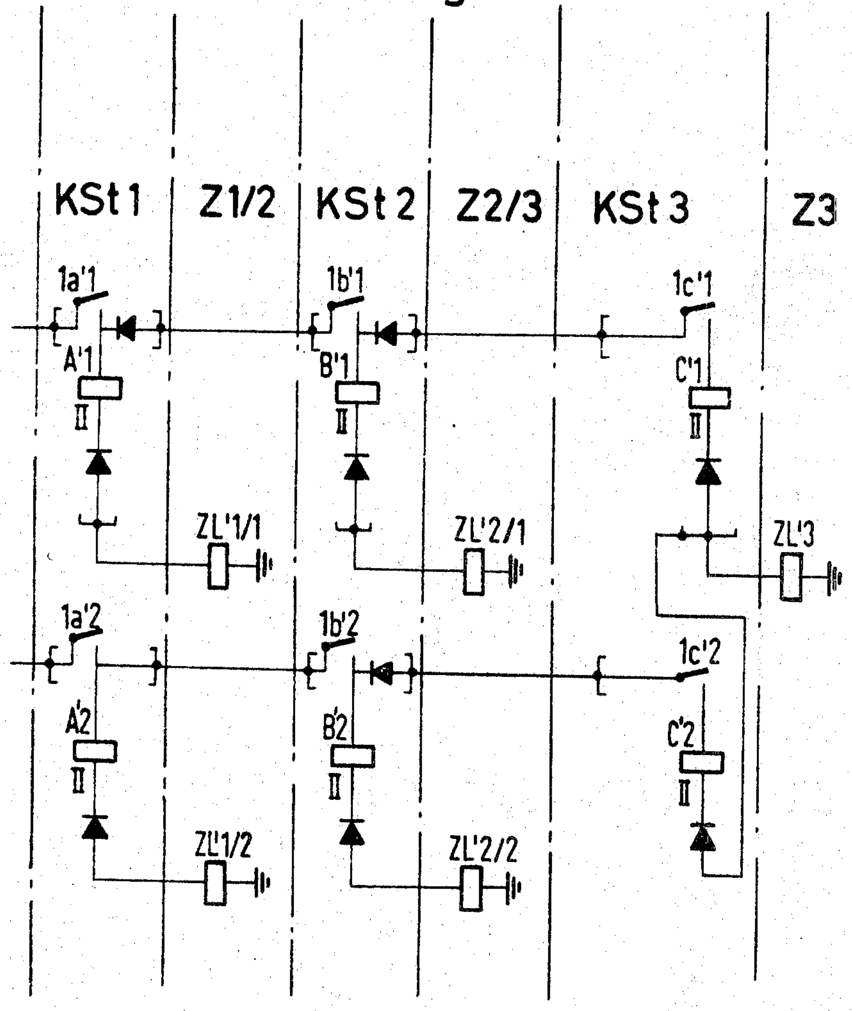
FIG. 4 shows a modification of the embodiment shown in FIG. 3.

FIG. 4 illustrates a modified embodiment of the holding circuits shown in FIG. 3. The holding circuits extend through windings II of switching relays A1, B1, C1, A2, B2, C2. To distinguish these relays as well as the intermediate line relays they are designated in FIG. 4 as follows: A'1, B'1, C'1; A'2, B'2, C'2; ZL'1/1, ZL'1/2, ZL'2/1, ZL'2/2.

A holding circuit of a connection is established in the embodiment of FIG. 4 in the same manner as the connection itself. The circuit means, for example the subscriber circuit TS1 and the connection line repeater VL1, which are interconnected with each other, supply as a holding potential a negative voltage. The holding contacts connect such holding potential to all energized switching relay holding windings II and to all intermediate line relays of the intermediate lines which follow the energized coupling relays.

In a connection which extends, as described, through three switching stages the following holding circuit exists:

(6) Ground;ZL'1/1;A'1(II);1*a*'1;negative at TS.
Ground;ZL'2/1;B'1(II);1*b*'1;negative at TS.
Ground;ZL'3;C'1(II);1*c*'1;1*b*'1;1*a*'1;negative at TS.
Ground;ZL'1/2;A'2(II);1*a*'2;negative at VL.
Ground;ZL'2/2;B'2(II);1*b*'2;1*a*'2;negative at VL.
Ground;ZL'3;C'2(II);1*c*'2;1*b*'2;1*a*'2;negative at VL.

On the other hand, in a connection which extends, as described, through only two switching stages a circuit exists as follows:

(7)
Ground; ZL'2/2; B'2(II); 1*b*'2;
____________________ 1*a*'2; negative at VL'
Ground; ZL'1/2; A'2(II);

In the holding circuits of FIG. 4 the coupling relays are connected in parallel to a through connected holding wire. The respective intermediate line relays are connected in series with the switching relays. This feature avoids the need for a chain of contacts as are shown in FIG. 3, for example at . . . 1b1 . . . .

It is to be understood that the invention is not limited to the particular features described and shown, but that it comprises any modifications and equivalents within the scope of the appended claims.

We claim:

1. A circuit arrangement for communication exchange systems, which comprises:

at least one switching network having input means and output means;

a plurality of switching stages in said switching network, including a first switching stage, with each switching stage having inputs and outputs, each of said switching stages including a plurality of switches;

intermediate lines connecting the switches of each stage together, and connecting successive switching stages to each other so that the outputs of a preceding stage are connected to the inputs of the next following stage;

subscriber lines, connecting lines, and circuit means connected to the inputs of the first switching stage;

a connecting means in said switching stages for connecting outputs of preceding stages in pairs with each other through connecting paths in said switching network including said intermediate lines;

a pathfinder network in the switching network for selecting from a number of available through-connecting paths the path which runs through the least number of switching stages between the inputs of the first switching stage which are to be connected with each other, said network including a plurality of pathfinder wires for each intermediate line, said pathfinder wires being combined in pathfinder junctions provided for each of said switches;

intermediate line relay means having switch members associated with said pathfinder wires for indicating whether the respective intermediate line is idle or busy, said pathfinder network further comprising two pathfinder network planes;

pathfinder relays arranged between two pathfinder junctions corresponding to a single switch; and means for applying different marking potentials to the pathfinder wires of the inputs of the first switching stage of the switching network, said marking potentials reaching one of said pathfinder junctions in response to the condition of the intermediate lines extending between a marked input and the associated pathfinder junction.

2. The circuit arrangement as recited in claim 1, which further comprises:

decoupling rectifiers in said pathfinder wires corresponding to the intermediate lines, said decoupling rectifiers being connected in one polarity in one of said planes and in the opposite polarity in the other of said planes.

3. The circuit arrangement as recited in claim 1, which further comprises:

decoupling rectifiers connected in series with said pathfinder relays.

4. The circuit arrangement as recited in claim 1, wherein said pathfinder relays comprise contacts so connected in series that upon the response of several pathfinder relays only one pathfinder relay provides a pathfinder marking for its corresponding coupler.

5. The circuit arrangement as recited in claim 4, which further comprises:

means for rendering effective said one pathfinder relay of the several responsive pathfinder relays which corresponds to switches of the switching stage closest to the input means of the switching network.

6. The circuit arrangement as recited in claim 1, wherein said switches comprise:

switch inputs and switch outputs;

first inner lines connected to said switch inputs, and second inner lines connected to said switch outputs; and switching relays having contacts for connecting each of said first inner lines with each of said second inner lines.

7. The circuit arrangement as recited in claim 6, wherein only a portion of said switch outputs is connected to said intermediate lines, and said intermediate line relay means is provided for all switch outputs.

8. The circuit arrangement as recited in claim 6, which further comprises:

pathfinder marking means for marking said switches;

means for connecting two switch inputs of a marked switch to the input means of said switching network; and means for connecting said two switch inputs with each other through one of said second inner lines.

9. The circuit arrangement as recited in claim 8, which further comprises:

pathfinder relays having contacts;

a selection contact chain including contacts of said intermediate line relay means corresponding to the second inner lines of the switch;

response wires in said second inner lines; and means for applying a pathfinder marking to one of said response wires from one of said pathfinder relay contacts through one contact of said selection contact chain.

10. The circuit arrangement as recited in claim 9, wherein a number of said second inner lines connected to said coupler outputs remains unconnected from the intermediate lines, and further including:

means for controlling said selection contact chain to preferentially apply said pathfinder marking to a response wire of one of said number of unconnected second inner lines.

11. The circuit arrangement as recited in claim 6, which further comprises:

holding circuits for said switching relays;

holding windings and holding contacts in said switching relays; and holding wires in said first and second inner lines, wherein the holding contacts close said holding circuits through said holding wires to energize a respective holding winding.

12. The circuit arrangement as recited in claim 6, which further comprises:

means for closing a holding circuit for each connection; and means for connecting the switching relays of several switching stages in parallel to said holding circuit.

13. The circuit arrangement as recited in claim 12, which further comprises:

holding windings in said switching relays; and means for connecting the holding windings of the switchig relays relating to one of said second inner lines, and the intermediate line relay corresponding to said one second inner line in series with each other.

References Cited

UNITED STATES PATENTS 3,308,242 7/1967 Erwin.

WILLIAM C. COOPER, Primary Examiner